(No Model.)
G. W. FRY.
COVER FOR JELLY TUMBLERS.
No. 358,114. Patented Feb. 22, 1887.
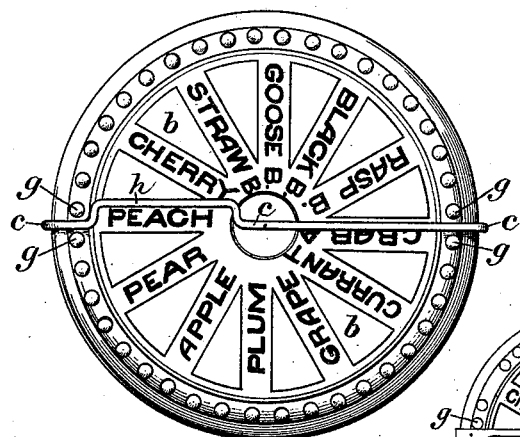
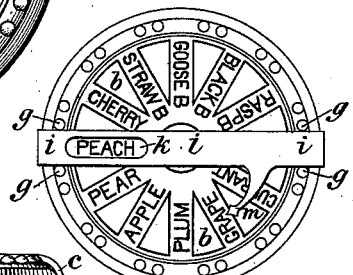
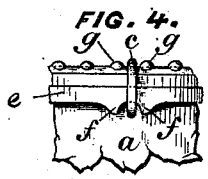
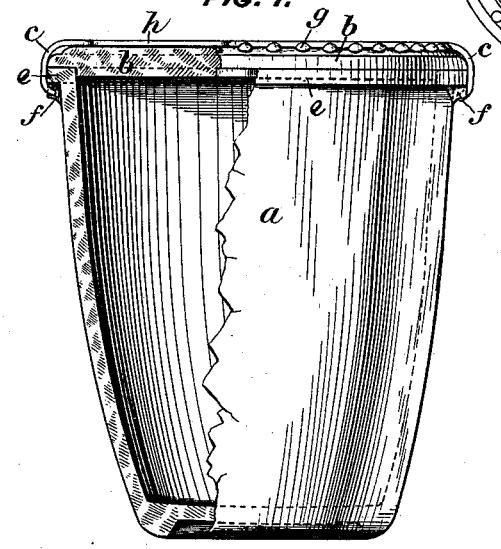
WITNESSES.
INVENTOR

UNITED STATES PATENT OFFICE.

GEORGE W. FRY, OF BEAVER, ASSIGNOR TO THE ROCHESTER TUMBLER COMPANY, OF PITTSBURG, PENNSYLVANIA.

COVER FOR JELLY-TUMBLERS.

SPECIFICATION forming part of Letters Patent No. 358,114, dated February 22, 1887.

Application filed December 16, 1886. Serial No. 221,722. (No model.)

*To all whom it may concern:*

Be it known that I, GEORGE W. FRY, of Beaver, in the county of Beaver and State of Pennsylvania, have invented a new and useful Improvement in Covers for Jelly-Tumblers; and I do hereby declare the following to be a full, clear, and exact description thereof.

My invention relates to an improvement in that class of jelly-tumblers in which a lid or cover is used, and the same is secured in place by a bail or other fastening device extending across the top.

It also relates to jelly-tumblers having a mark or name to indicate the particular character of the contents.

To enable others skilled in the art to make and use my invention, I will now describe it by reference to the accompanying drawings, in which—

Figure 1 is a side elevation, partly in section, of a jelly-tumbler illustrating my improvement. Fig. 2 is a plan view. Figs. 3 and 4 are detail views. Fig. 5 is a plan view of a modification.

Like letters of reference indicate like parts in each.

The jelly-tumbler $a$ is made of glass or earthenware, and is provided with a top, $b$, of any suitable description, and a bail or securing-wire, $c$, for securing the top to the tumbler. The wire $c$ is elastic and is sprung into place over the top without difficulty. In the particular instance shown in Figs. 1 and 2 the ends of the wire are bent under the flange or bead $e$ of the tumbler, and are prevented from side motion by lugs $f$; or this may be done by a suitable recess or groove in the flange or bead.

On the surface of the cover $b$, preferably at or near the periphery, are beads or lugs $g$, which prevent the cover from turning or slipping under the wire. These beads or lugs, one of which is arranged on each side of the wire at both sides of the cover, may be continued all around, as in Fig. 1, for the purpose of ornamentation. Instead of making the lugs $g$, there may be a continuous bead around the top of the cover and grooves made therein for receiving the wire. This will accomplish the same purpose of preventing the rotation of the cover; or suitable lugs may be arranged at any part of the surface of the cover to accomplish the same end.

On the surface of the cover I print, mark, mold, or indent in any desired order, but preferably in the order and position shown in the drawings, the names of several varieties of fruits from which jellies are made, and I form the securing-wire $c$ with a bend or offset, $h$, for the purpose of encircling or otherwise indicating a particular name on the cover, so that when the tumbler is filled with a particular kind of jelly the name indicating such kind may be just under or within the indicating portion $h$ of the securing-wire $c$. It is apparent from this description that this object may be accomplished with other forms of securing devices. An instance of one form is shown in Fig. 5, where a sheet-metal bail extends across the top, and, by entering into grooves in the flange or bead of the tumbler, is prevented from turning. The sheet-metal fastening is flexible and elastic, and springs into place when pressed laterally over the top. The grooves which secure it are formed in the bead or flange $e$ when the tumbler is molded or pressed, and they may be like the groove or recess between the lugs $f$ in Fig. 4, or be indented or made directly in the plain side of the bead, as will be readily understood. This sheet-metal fastening $i$ has a slot, $k$, through which the desired name is visible; or the same result may be accomplished by using a pointer or indicator, $m$, as shown on Fig. 3, to indicate any one of the names.

It is my intention to make the cover of glass with the names pressed in or on the same.

What I claim as my invention, and desire to secure by Letters Patent, is—

A jelly-tumbler having a cover with a series of names thereon and a securing-wire or other device for securing the cover in a fixed position on the tumbler, said securing device being formed to indicate one of the names on the cover, substantially as and for the purposes described.

In testimony whereof I have hereunto set my hand this 18th day of November, A. D. 1886.

GEORGE W. FRY.

Witnesses:
THOMAS B. KERR,
W. B. CORWIN.